United States Patent
Brandt, II et al.

(10) Patent No.: US 11,868,109 B2
(45) Date of Patent: Jan. 9, 2024

(54) SENSOR INTERFACE CIRCUIT CONTROLLER FOR MULTIPLE SENSOR TYPES IN AN INTEGRATED CIRCUIT DEVICE

(71) Applicant: Apple Inc., Cupertino, CA (US)

(72) Inventors: Robert S. Brandt, II, Satellite Beach, FL (US); Bruno W. Garlepp, Sunnyvale, CA (US); Ke Yun, San Jose, CA (US); Navin Kumar, San Jose, CA (US); Jafar Savoj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 117 days.

(21) Appl. No.: 17/466,320

(22) Filed: Sep. 3, 2021

(65) Prior Publication Data

US 2023/0076507 A1  Mar. 9, 2023

(51) Int. Cl.
*G05B 19/042* (2006.01)
*G06F 13/38* (2006.01)

(52) U.S. Cl.
CPC ......... *G05B 19/042* (2013.01); *G06F 13/387* (2013.01); *G05B 2219/25341* (2013.01)

(58) Field of Classification Search
CPC .. G05B 19/401; G05B 19/042; G05B 19/406; G06F 13/387; G06F 13/4004; G06F 13/4009; G06F 13/4018; G06F 13/405
See application file for complete search history.

(56) References Cited

U.S. PATENT DOCUMENTS

| | | | |
|---|---|---|---|
| 7,356,580 B1 * | 4/2008 | Huang | G06F 13/4081 709/224 |
| 9,859,918 B1 | 1/2018 | Gopal et al. | |
| 2008/0147222 A1 * | 6/2008 | McIntyre | G03F 7/70616 700/108 |
| 2013/0120178 A1 * | 5/2013 | Murakami | G01D 3/032 341/155 |
| 2014/0281113 A1 * | 9/2014 | Trethewey | G06F 13/4022 710/317 |
| 2019/0377319 A1 * | 12/2019 | Sivich | G05B 19/401 |
| 2021/0028625 A1 | 1/2021 | Inoue et al. | |
| 2021/0360071 A1 * | 11/2021 | Chakraborty | H04L 41/0846 |

OTHER PUBLICATIONS

Juha Niemi, "The design and implementation of sensor communication protocol with connectivity adapter interfaces in nRF51822 embedded development platform," University of Oulu, Faculty of Information Technology and Electrical Engineering / M3S, Master's Thesis, Jul. 5, 2016, 55 pages.

* cited by examiner

*Primary Examiner* — Raymond N Phan
(74) *Attorney, Agent, or Firm* — Kowert, Hood, Munyon, Rankin & Goetzel, P.C.; Gareth M. Sampson; Dean M. Munyon (57) ABSTRACT

A universally-designed control circuit for communicating with multiple types of sensors is disclosed. For example, a control circuit may communicate with either ring oscillator-based sensors or BJT-based sensors based on programming implemented in the control circuit. The control circuit may include programmable communication protocol circuits for communicating with the sensors and conversion circuits that convert a particular type of sensor data packet into a generic format. The generic format sensor data may then be utilized by a power management unit or other device to control operation of an integrated circuit.

20 Claims, 9 Drawing Sheets

```
┌─────────────────────────────────────────────────┐
│ Receiving, at a first sensor control circuit,   │
│ first sensor data from a first plurality of     │
│ sensors of a first type, wherein the first      │
│ sensor control circuit communicates with the    │
│ first type of sensor using a first protocol     │
│                      802                        │
└─────────────────────────────────────────────────┘
                        ↓
┌─────────────────────────────────────────────────┐
│ Converting, at the first sensor control circuit,│
│      the first sensor data to a generic format  │
│                      804                        │
└─────────────────────────────────────────────────┘
                        ↓
┌─────────────────────────────────────────────────┐
│ Receiving, at a second sensor control circuit,  │
│ second sensor data from a second plurality of   │
│ sensors of a second type, wherein the second    │
│ sensor control circuit communicates with the    │
│ second type of sensor using a second protocol   │
│                      806                        │
└─────────────────────────────────────────────────┘
                        ↓
┌─────────────────────────────────────────────────┐
│ Converting, at the second sensor control        │
│ circuit, the second sensor data to the generic  │
│ format                                          │
│                      808                        │
└─────────────────────────────────────────────────┘
                        ↓
┌─────────────────────────────────────────────────┐
│ Outputting the first sensor data and the second │
│ sensor data in the generic format               │
│                      810                        │
└─────────────────────────────────────────────────┘
```

SENSOR INTERFACE CIRCUIT CONTROLLER FOR MULTIPLE SENSOR TYPES IN AN INTEGRATED CIRCUIT DEVICE

BACKGROUND

Technical Field

Embodiments described herein relate to electronic circuits. More particularly, embodiments described herein relate to electronic circuits used to control sensors that measure local operating properties in an integrated circuit.

Description of the Related Art

As features sizes have decreased, the number of transistors on integrated circuits (ICs) has correspondingly increased. The increased number of transistors per unit area has resulted in a corresponding increase in power per unit area and, accordingly, thermal output (heat generation) of ICs. This trend has occurred despite the fact that the increased number of transistors per unit area has also corresponded to a decrease in the supply voltages provided to various functional circuitry on an IC. These trends have in turn led to significant challenges in balancing performance, power consumption, and thermal output of ICs. To this end, many ICs implement subsystems that monitor various metrics of the IC (e.g., temperature, voltage, voltage drops) and adjust the performance of the IC based on received measurements from these subsystems. Temperature is one metric that is commonly monitored for various reasons. Accordingly, an IC may have temperature sensors implemented thereon (e.g., within certain functional circuit blocks). Such temperature sensors may provide temperature readings to other circuits that carry out various control functions, such as adjusting voltages, clock frequencies, and/or workloads of various functional circuit blocks based on their respectively reported temperatures.

SUMMARY

A universal controller is provided to support multiple different types of sensors inside an SoC (e.g., an SoC with a CPU and a GPU). The sensors may include chains of multiple sensors with different chains for different types of sensors (such as ring oscillator-based sensors or BJT-based sensors). The controller may include programmable communication protocol circuits to communicate with any type of sensor. In various embodiments, the communication protocol circuits may adjust the length of data packets sent to/received from the sensors. The controller also includes conversion circuits that convert the particular sensor data packets to a generic format that can then be transmitted from the controller. The conversion circuits may, for example, apply a programmable mathematical solver to sensor data to convert the sensor data into the generic format.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a temperature sensing control system usable in integrated circuits. As features sizes of devices on integrated circuits have become smaller, the density of circuitry has correspondingly increased. Increased density of circuitry can result in higher density power consumption, and thus, faster temperature rises in "hot spots" (e.g., high activity portions of the IC) occurring during operation of an integrated circuit. Furthermore, these hot spots may be more localized due to the increased circuit density. Thus, implementing sensing circuitry (e.g., temperature sensors) within these high-density circuits has become more challenging.

Therefore, the implementation of high-precision, compact temperature sensors (among other types) has become increasingly important in integrated circuits, such as central processing units (CPUs), graphics processing units (GPUs), and so on. Temperature sensing and monitoring may be performed to detect rising temperatures and thus allow corrective actions to be taken to prevent overheating, functional failures, and even physical failure of the circuits. However, due to the density of the circuits and the localization of hot spots, the compactness of temperature sensing circuitry is becoming more important, as it is desirable to place such circuitry as close as possible to (if not within) the circuitry that produces hot spots. Additionally, due to the density of modern integrated circuits, large temperature gradients may exist on a single chip, and thus more instances of a temperature sensing circuit may be implemented.

The need for a greater number of temperature sensors can create a significant number of design challenges. For example, the analog circuits used to implement temperature sensors often require different power supplies than the digital circuitry implemented in various types of integrated circuits. This can create complications involving routing connections for analog power supplies into areas with a high density of digital circuits. Another challenge is communication and control of the temperature sensors. Different types of temperature sensors that have different communication protocols and/or outputs may be implemented in integrated circuits for various reasons. For example, temperature sensors based on ring oscillators and temperature sensors based on bipolar transistors can be implemented in an integrated circuit design. Having multiple sensor types in an integrated circuit design may, however, create problems with communication as different communication protocols are needed for each sensor type.

The present disclosure is directed to controllers for temperature sensors that may be universal in hardware design and are programmable to different types of sensors. Thus, instead of having an integrated circuit design with multiple types of controllers for different sensors, the integrated circuit design may have a universal controller design. Having universal controller designs that are programmable can simplify design and manufacture of an integrated circuit. Various embodiments of a universal temperature sensor controller system and the circuits implemented therein are now discussed in further detail.

Figure 1:
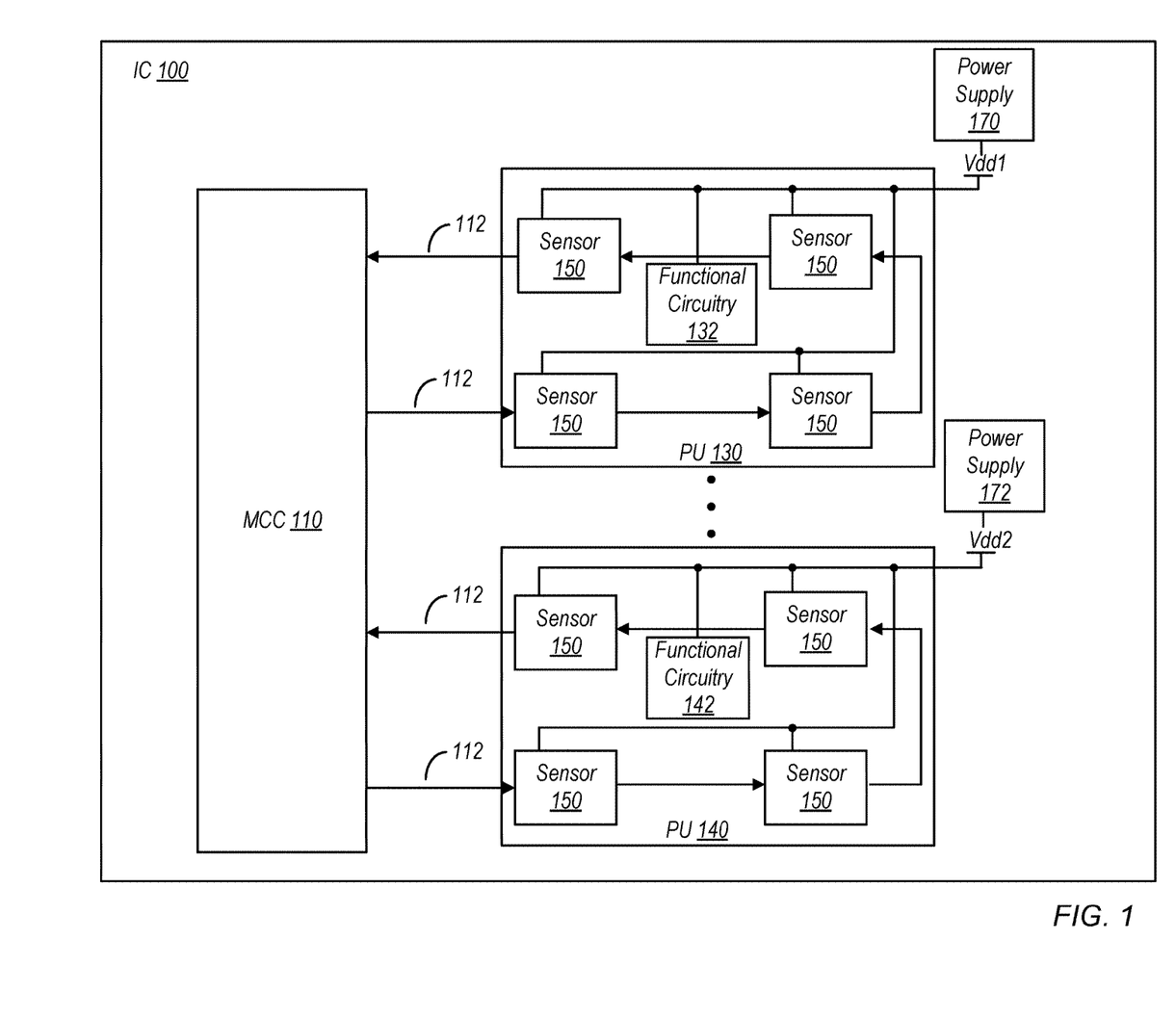
FIG. 1 depicts a block diagram of an embodiment of an integrated circuit.

FIG. 1 depicts a block diagram of an embodiment of an integrated circuit (IC). In the illustrated embodiment shown, IC 100 includes metrology control circuitry (MCC) 110 and two functional circuit blocks, processing unit (PU) 130, and PU 140. In various embodiments, other functional circuit blocks may be included, including additional instances of PU 130 or PU 140. PU 130 and PU 140 are thus shown here as exemplary functional circuit blocks, but are not intended to limit the scope of this disclosure. Each of PU 130 and 140 may be a general purpose processor core, a central processing unit (CPU), a graphics processing unit (GPU), a digital signal processing unit, or virtually any other kind of functional unit/circuitry configured to perform a processing function. The scope of this disclosure may apply to any of these types of functional circuit blocks, as well as others not explicitly mentioned herein. The number of functional circuit blocks shown here is by way of example as well, as the disclosure is not limited to any particular number.

In certain embodiments, PU 130 is a general purpose processor core configured to execute the instructions of an instruction set and perform general purpose processing operations. Functional circuitry 132 of PU 130 may thus include various types of circuitry such as execution units of various types (integer, floating point, etc.), register files, schedulers, instruction fetch units, various levels of cache memory, and other circuitry that may be implemented in a processor core.

In certain embodiments, functional circuitry 132 in PU 130 is coupled to receive first supply voltage Vdd1 from power supply 170. Power supply 170 may be a digital power supply such as a processing unit power supply. It is noted however that multiple power domains, and thus multiple supply voltages, may be implemented within various embodiments of PU 130 and functional circuitry 132, as described herein. Furthermore, supply voltages provided to PU 130 and functional circuitry 132 may be variable under the control of power management circuitry (not shown). The power management circuitry adjusts the voltages for various reasons, such as controlling performance levels, thermal output, and power consumption.

In certain embodiments, PU 140 includes functional circuitry 142, which may implement various types of graphics processing circuitry such that PU 140 is a GPU. This may include graphics processing cores, various types of memory and registers, and so on. In some embodiments, functional circuitry 142 in PU 140 is coupled to receive a second supply voltage, Vdd2, from power supply 172. Power supply 172 may be a digital power supply such as a processing unit power supply. Power supply 172 and second supply voltage Vdd2 may be separate from power supply 170 and first supply voltage Vdd1 although embodiments may be contemplated where power supply 170 and power supply 172 are a single power supply.

In certain embodiments, both PU 130 and PU 140 include a number of sensors 150. The particular number of sensors 150 shown here is for example only, and in actual embodiments may be greater, lesser, or equal. Sensors 150 may be configured for sensing one or more operating properties of PU 130 or PU 140 (e.g., performance metrics or parameters of the processing units). In certain embodiments, sensors 150 are configured to sense operating voltage or operating temperature values (e.g., local operating voltage or operating temperature values for PU 130 and/or PU 140). Sensors 150 may implement, for example, ring oscillators, bipolar junction transistors (BJTs), or a combination thereof to sense operating voltage or operating temperature values. Examples of ring oscillator-based sensors and BJT-based sensors are described in more detail below with respect to FIGS. 5 and 6, respectively. The sensed voltage and temperature values may in turn be used to determine whether or not circuitry implemented therein (e.g., functional circuitry 132 or functional circuitry 142) is operating within limits, must be restricted to lower performance operation, and/or is capable of higher performance. In some embodiments, sensors 150 are configured to sense other local operating values such as, but not limited to, current.

Figure 2:
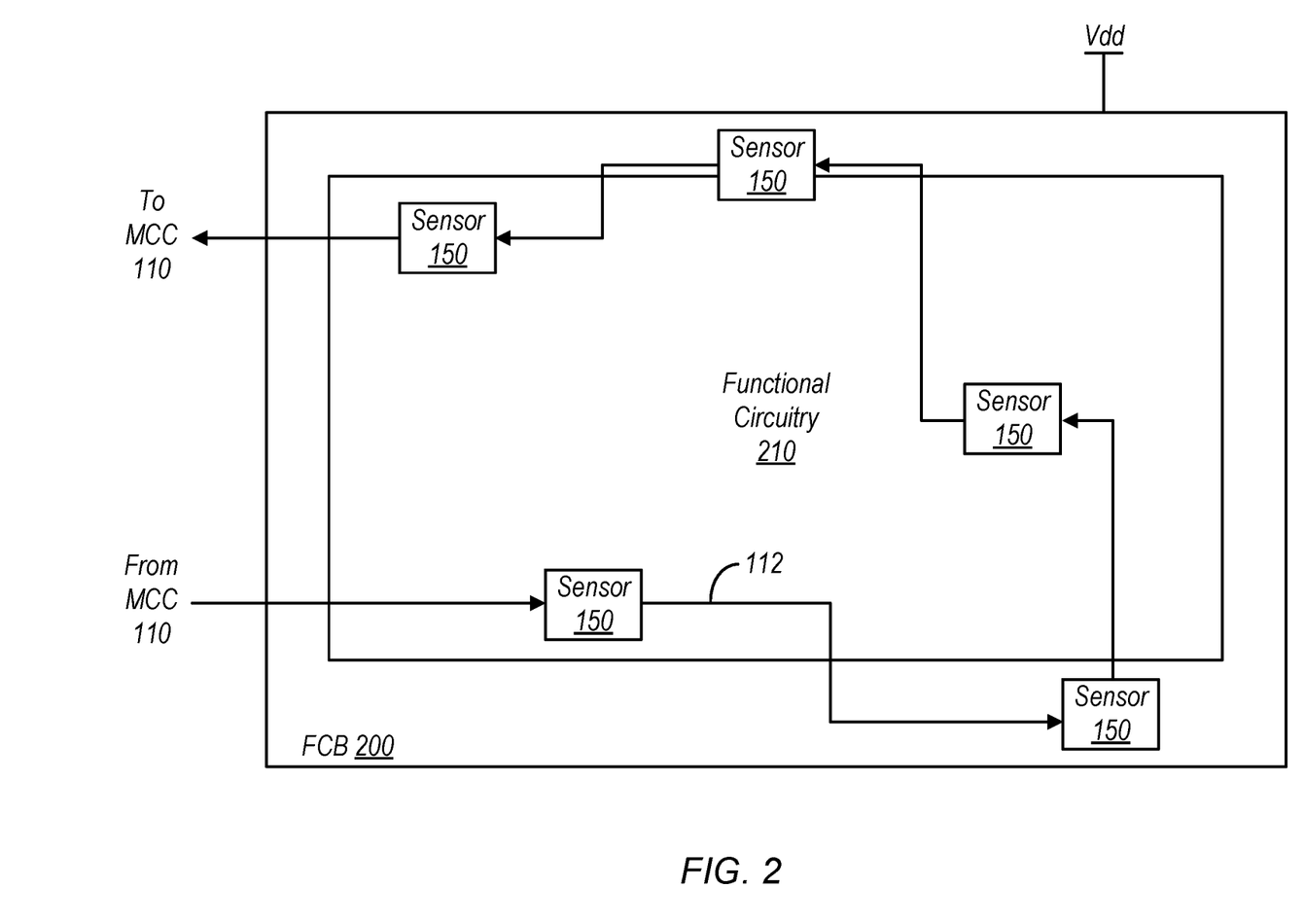
FIG. 2 is a block diagram of one embodiment of a functional circuit block having a number of sensors.

FIG. 2 is a block diagram of one embodiment of a functional circuit block having a number of sensors 150. In the illustrated embodiment, functional circuit block (FCB) 200 includes functional circuitry 210, which may be virtually any type of functional circuitry implemented on an IC (such as PU 130 and/or PU 140). Included in functional circuitry 210 may be digital circuits, analog circuits, and/or mixed signal circuits. FCB 200 also includes a number of sensors 150, which may be connected in a serial chain by bus 112. Sensors 150 of FCB 200 are implemented in various places in and around functional circuitry 210. A first sensor 150 in the embodiment shown is coupled to receive information, via bus 112, from MCC 110, while a last sensor 150 may send information, via bus 112, to MCC 110. In various embodiments, each of the sensors 150 is coupled to receive the same supply voltage, Vdd, as received by the functional circuitry 210 though other embodiments may be contemplated where the sensors operate from different supply voltages received by the functional circuitry 210.

Turning back to FIG. 1, in the illustrated embodiment, IC 100 includes metrology control circuitry (MCC) 110. MCC 110 may be, for example, a universal controller that performs various operations involved with operation of sensors 150 in the various functional circuit blocks of IC 100. In some embodiments, MCC 110 is coupled to each of the sensors 150 via bus 112. During operation of IC 100, as described herein, sensors 150 may perform readings (e.g., frequencies of ring oscillators or voltages of BJTs), convert the readings into a digital format, and transmit the digitally formatted information as output to MCC 110. MCC 110 may receive the output information from sensors 150 via their correspondingly coupled instances of metrology bus 112. Using the output information, MCC 110 may determine a voltage or temperature sensed by each of sensors 150. In certain embodiments, bus 112 is a serial bus, and a group of sensors 150 are coupled serially in a scan chain. Embodiments for mechanisms of communication with groups (sets) of sensors 150 are described herein.

Figure 3:
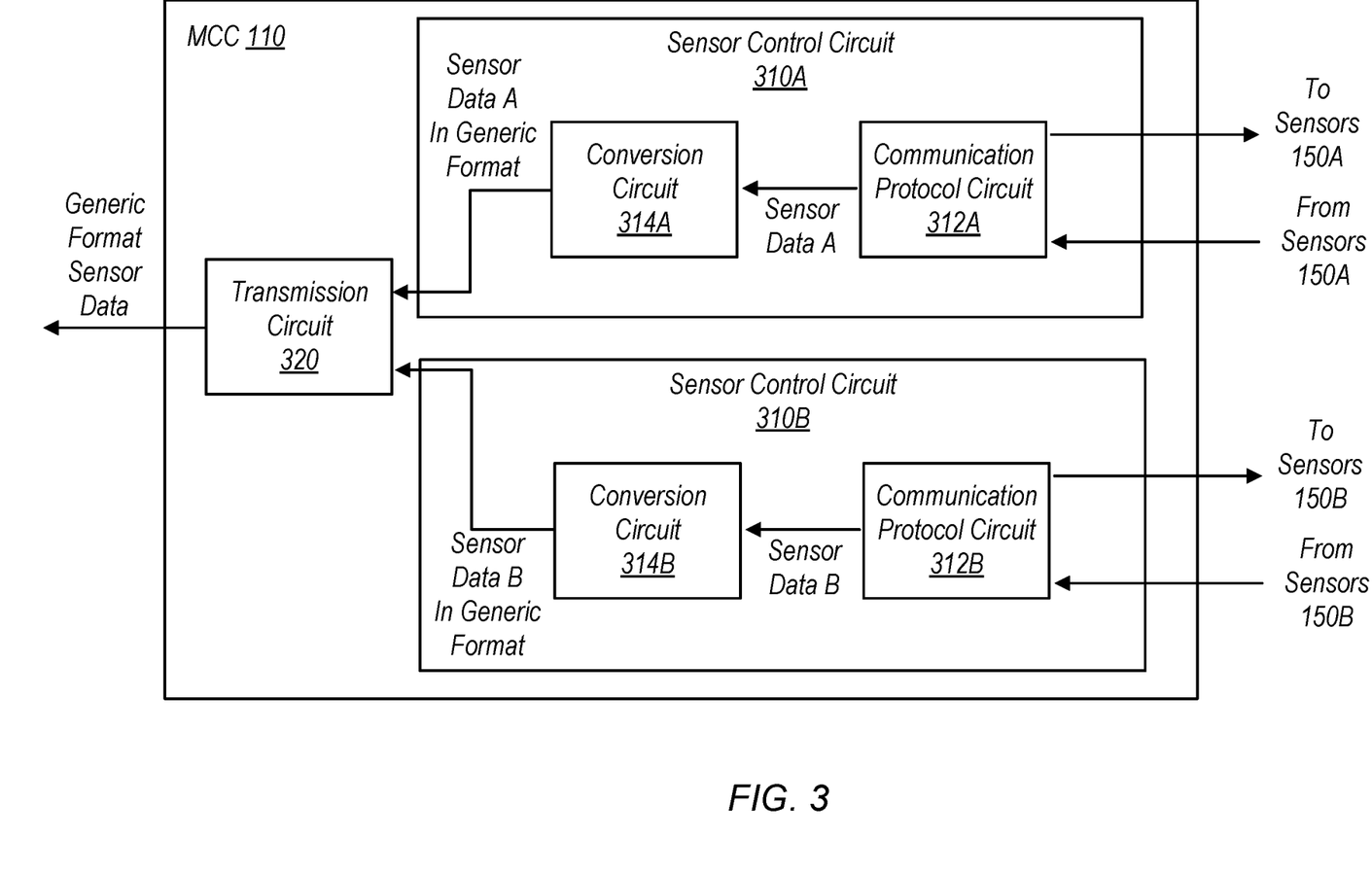
FIG. 3 is a block diagram of metrology control circuitry (MCC), according to some embodiments.

FIG. 3 is a block diagram of MCC 110, according to some embodiments. In the illustrated embodiment, MCC 110 includes first sensor control circuit 310A and second sensor control circuit 310B. MCC 110 may, however, include any number of sensor control circuits 310. Sensor control circuits 310 may be coupled to sensors 150. In various embodiments, an instance of a sensor control circuit 310 is coupled to a set of sensors 150. For example, in the illustrated embodiment, first sensor control circuit 310A is coupled to first set of sensors 150A and second sensor control circuit 310B is coupled to second set of sensors 150B.

In various embodiments, first set of sensors 150A and second set of sensors 150B are sets of sensors located in a single functional circuit block (such as FCB 200 in IC 100). In some embodiments, first set of sensors 150A and second set of sensors 150B are sets of sensors located in different functional circuit blocks. For instance, first set of sensors 150A may be located in a first functional circuit block and second set of sensors 150B may be located in a second functional circuit block. Various additional embodiments may be contemplated where sensors 150 are distributed across multiple functional circuit blocks. For example, both first set of sensors 150A and second set of sensors 150B may be distributed across multiple functional circuit blocks. In general, sensors 150 may be placed anywhere in IC 100 with the sets of sensors being serially connected.

In certain embodiments, first set of sensors 150A and second set of sensors 150B are different types of sensors. For example, first set of sensors 150A may be ring oscillator-based sensors and second set of sensors 150B may be BJT-based sensors. Other types of sensors may also be contemplated. Different types of sensors 150 may be implemented in IC 100 to provide different operating properties such as, but not limited to, sensitivity, clock speed, and power consumption. In some embodiments, first set of sensors 150A and second set of sensors 150B are the same types of sensors (e.g., the first and second set of sensors may provide redundant sensing of temperature or voltage or may be placed to sense these parameters in different locations on the integrated circuit).

Figure 4:
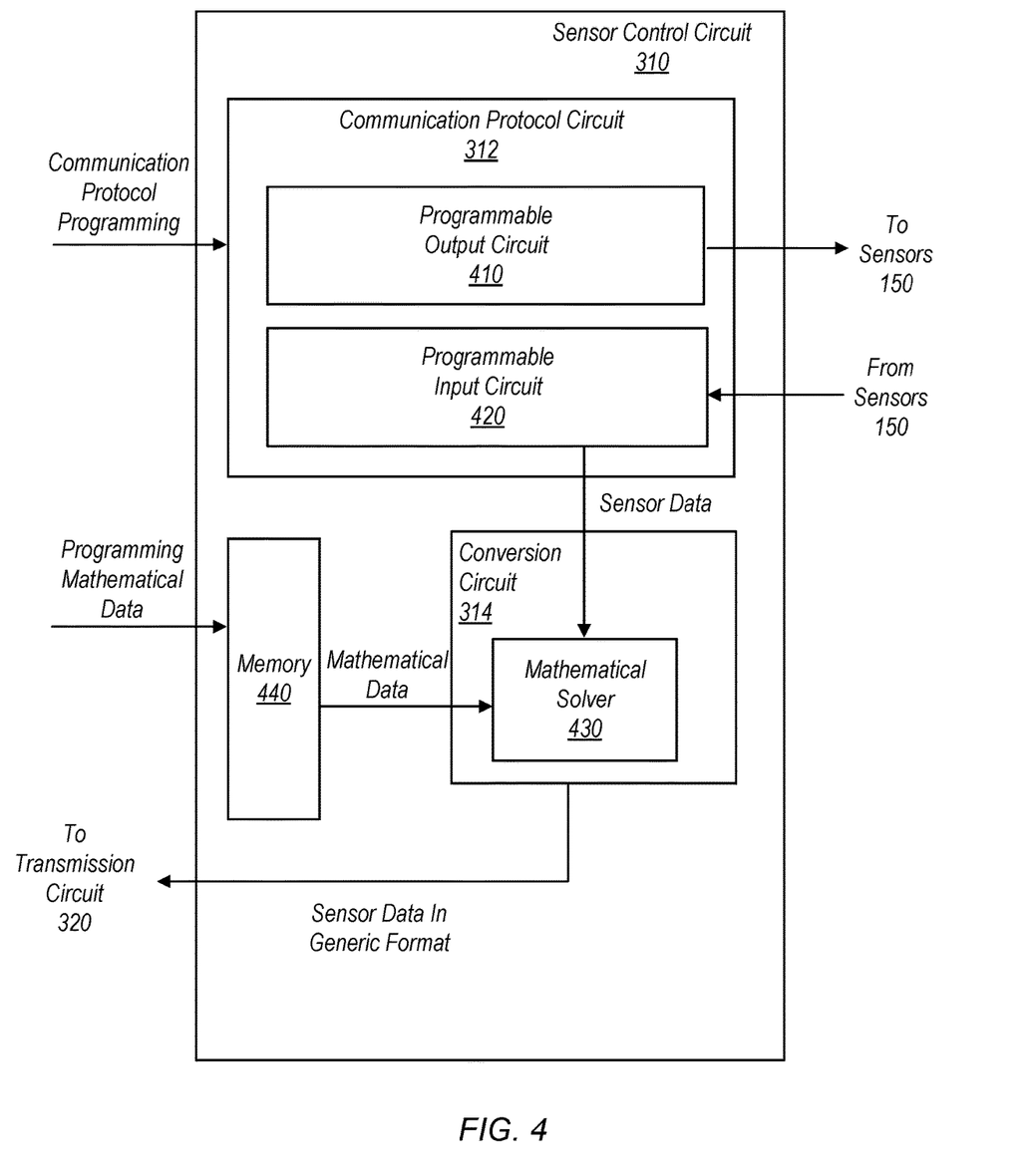
FIG. 4 is a block diagram of a sensor control circuit, according to some embodiments.

In various embodiments, first sensor control circuit 310A includes first communication protocol circuit 312A and first conversion circuit 314A. Similarly, second sensor control circuit 310B includes second communication protocol circuit 312B and second conversion circuit 314B. FIG. 4 is a block diagram of sensor control circuit 310, according to some embodiments. In the illustrated embodiment, sensor control circuit 310 includes an embodiment of communication protocol circuit 312 and conversion circuit 314 that may be implemented in first sensor control circuit 310A or second sensor control circuit 310B.

Turning back to FIG. 3, first communication protocol circuit 312A is coupled to first set of sensors 150A and second communication protocol circuit 312B is coupled to second set of sensors 150B. In certain embodiments, first communication protocol circuit 312A handles communications (e.g., sends/receives data) between first sensor control circuit 310A and first set of sensors 150A using a first protocol while second communication protocol circuit 312B handles communications between second sensor control circuit 310B and second set of sensors 150B using a second protocol. In embodiments where first set of sensors 150A and second set of sensors 150B are different types of sensors, the first protocol and the second protocol may be different protocols. In embodiments where first set of sensors 150A and second set of sensors 150B are the same types of sensors, the first protocol and the second protocol may be the same protocol.

In certain embodiments, first communication protocol circuit 312A and second communication protocol circuit 312B include programmable communication logic to implement a protocol for communication with sensors 150. The programmable communication logic may be programmed to allow first communication protocol circuit 312A and second communication protocol circuit 312B to implement communication with the respective sensor sets, first set of sensors 150A and second set of sensors 150B, using protocols associated with the sensors. For example, the programmable communication logic may provide programmability in a protocol for a number of bits read/write per sensor in the sets of sensors 150.

For instance, as shown in FIG. 4, communication protocol circuit 312 may include programmable output circuit 410 and programmable input circuit 420. In various embodiments, programmable output circuit 410 writes data to program sensors 150 for operation (e.g., collecting sensor data) using a programmed protocol. Programmable input circuit 420 may read sensor data captured by sensors 150 using the programmed protocol while mapping the sensor data for further processing in MCC 110 (e.g., for output to conversion circuit 314). In some contemplated embodiments, programmable output circuit 410 and programmable input circuit 420 are node sequencers that determine the number of bits going out of and coming into communication protocol circuit 312. The programmability of programmable output circuit 410 and programmable input circuit 420 allows the circuits to be programmed to provide the proper sequencing of bits going out of and coming into communication protocol circuit 312. For example, programmable output circuit 410 may be programmed to provide proper sequencing for bits going out to a set of sensors 150 and programmable input circuit 420 may be programmed to provide proper sequencing for bits coming into communication protocol circuit 312.

As described above, communication protocol circuit 312 is programmable based on the types of sensors coupled to the communication protocol circuit. Because of this programmability, communication protocol circuit 312 may be implemented using hardware (e.g., circuit logic) that can be used in any instance of sensor control circuit 310 within IC 100. For example, first communication protocol circuit 312A and second communication protocol circuit 312B in MCC 110 may include the same hardware in the illustrated embodiment of FIG. 3. First communication protocol circuit 312A and second communication protocol circuit 312B may then be programmed in order to provide a specific communication protocol for the different sets of sensors.

As shown in FIG. 3, first communication protocol circuit 312A provides sensor data A (e.g., sensor data from first set of sensors 150A) to first conversion circuit 314A. Similarly, second communication protocol circuit 312B provides sensor data B (e.g., sensor data from second set of sensors 150B) to second conversion circuit 314B. Sensor data A may be in a format determined by programmable communication logic (e.g., programmable input circuit 420) in first communication protocol circuit 312A and sensor data B may be in a format determined by programmable communication logic (e.g., programmable input circuit 420) in second communication protocol circuit 312B. For example, formats of sensor data A and sensor data B may be mapped to first conversion circuit 314A and second conversion circuit 314B, respectively, by the instance of programmable input circuit 420 in each communication protocol circuit. As described above, sensor data A and sensor data B may be in different formats or in identical formats depending on the types of sensors 150A, 150B and/or the communication protocols for the sensors.

In certain embodiments, first conversion circuit 314A and second conversion circuit 314B include programmable logic to convert (transform) sensor data into a generic format. For instance, first conversion circuit 314A and second conversion circuit 314B may convert sensor data A and sensor data B, respectively, into values in a format that is readable by other logic or programming in IC 100 (such as a power management unit (PMU)). As one example, sensor data A may include raw sensor data from temperature sensors that is transformed into temperature values that are readable by other logic or programming in IC 100.

In various embodiments, as shown in FIG. 4, the programmable logic in conversion circuit 314 includes mathematical solver 430. Mathematical solver 430 may be, for example, a function solver, a polynomial solver, or another solver that converts sensor data into the generic format. One example of an implementation of a polynomial solver is described in the "Example Mathematical Solver" section below. In certain embodiments, mathematical solver 430 is programmable using mathematical data retrieved from memory 440. Memory 440 may be implemented using volatile memory, non-volatile memory, or a combination thereof. Mathematical data stored in memory 440 may include, but not be limited to, functions (such as polynomial functions), coefficients for functions, a lookup table, or other data useable by mathematical solver 430 to perform a math operation. Mathematical solver 430 may implement the mathematical data retrieved to convert the sensor data into the generic format.

Because mathematical solver 430 retrieves the mathematical data from memory 440, the mathematical solver may be implemented using hardware (e.g., circuit logic) that can be used in any instance of sensor control circuit 310 within IC 100. For example, in the illustrated embodiment of FIG. 3, first conversion circuit 314A and second conversion circuit 314B in MCC 110 may include the same hardware for implementing a mathematical function (e.g., a polynomial function). First conversion circuit 314A and second conversion circuit 314B may then be programmed based on the mathematical data retrieved from their respective memories in order to operate a specific mathematical operation for converting sensor data into the generic format.

In certain embodiments, mathematical solver 430 in conversion circuit 314, shown in FIG. 4, implements a mathematical function that is the most complex (longest) that is to be utilized in IC 100 (such as the two-dimensional polynomial described in the example below). In such embodiments, a specific conversion circuit 314 is programmed according to the mathematical data stored in its instance of memory 440 where the mathematical data is placed in the memory based on the type of sensor being communicated with by sensor control circuit 310. For instance, an embodiment may be contemplated where first conversion circuit 314A and second conversion circuit 314B, shown in FIG. 3, include the same hardware implementing the same complex mathematical function (e.g., the hardware implements the same two-dimensional polynomial). The complex mathematical function may be for a first type of sensor (e.g., first set of sensors 150A) while a second type of sensor (e.g., second set of sensors 150B) has a simpler, but similar, mathematical function. Accordingly, the memory for first conversion circuit 314A may store a set of coefficients for converting sensor data for the first type of sensor into the generic format using the complex mathematical function while the memory for second conversion circuit 314B stores a set of coefficients for converting sensor data for the first type of sensor into the generic format using the simpler mathematical function. It should be noted that each instance of the memory may store the same length (amount) of mathematical data. As such, for implementation of the simpler mathematical function, coefficients at the end of the mathematical data may be set as zeroes to match the length of mathematical data for the complex mathematical function.

As described herein, sensor control circuit 310 (shown in FIG. 4) may include universal hardware in both communication protocol circuit 312 and conversion circuit 314 that is programmable according to a type of sensor associated with the sensor control circuit. Accordingly, a single hardware implementation of the sensor control circuit 310 may be used for a variety of types of sensors 150 within IC 100 with each sensor control circuit being programmed according to its associated sensor type. Manufacturing integrated circuits with a single type of hardware implementation for sensor control circuit 310 may simplify the manufacturing and reduce manufacturing costs.

Programming (e.g., calibrations) of sensor control circuit 310 may be performed at various times, such as on a system startup, at selected times during the life of the system/IC, responsive to large variations in sensors 150, and so forth. As such, voltage and temperature, based on ring oscillator frequencies or outputs of BJT-based sensors, may be determined with a reasonable level of accuracy over the life of the system, while enabling the use of simple controllers and sensors having a small area footprint.

Returning to FIG. 3, after first conversion circuit 314A and second conversion circuit 314B convert sensor data A and sensor data B, respectively, into the generic format, the generically formatted data may be provided to transmission circuit 320. Transmission circuit 320 may then output the generic format sensor data to other logic or programming in IC 100 (such as a power management unit (PMU) or a microcontroller). The PMU or microcontroller may use the generic format temperature data, for example, to perform various temperature control actions, such as workload rebalancing, performance state reduction (e.g., reducing a clock frequency), or shutting down of the functional circuitry to prevent malfunctions and/or heat damage thereto.

Example Sensors

Example of Ring Oscillator-Based Sensor

Figure 5:
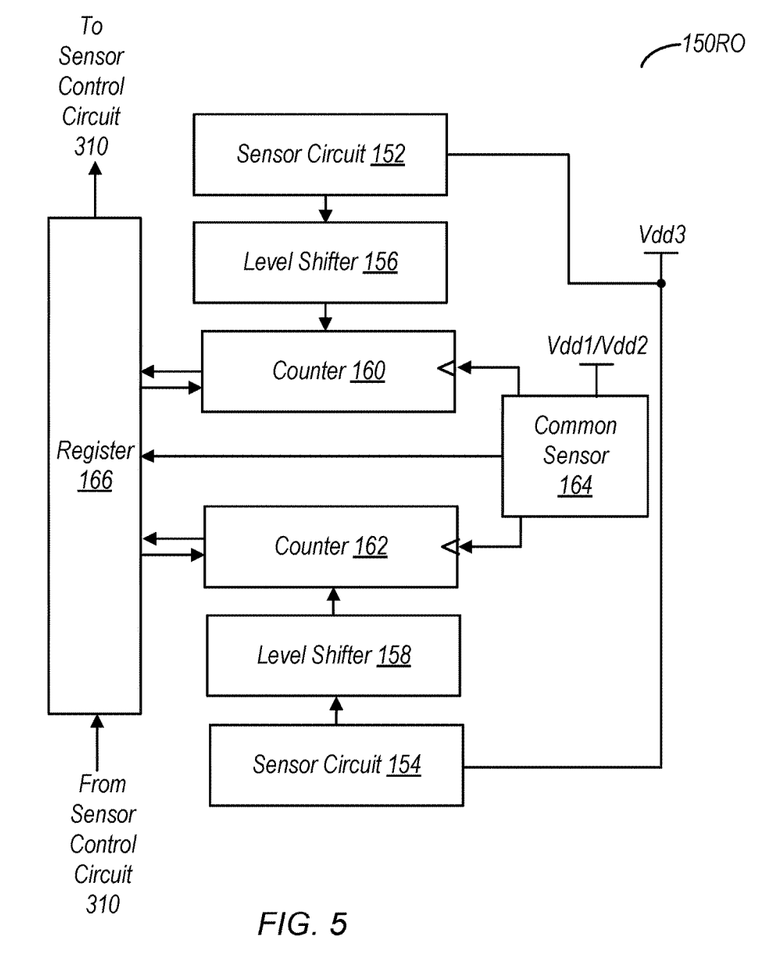
FIG. 5 depicts a block diagram illustrating an embodiment of a ring oscillator-based sensor.

FIG. 5 depicts a block diagram illustrating an embodiment of a ring oscillator-based sensor 150RO. In certain embodiments, sensor 150RO includes sensor circuit 152 and sensor circuit 154. The particular number of sensor circuits in sensors 150RO may, however, vary. Sensor circuits 152, 154 may include one or more elements that operate to sense one or more operating properties of a functional circuit block in which sensor 150RO is positioned. For example, sensor circuits 152, 154 may sense operating voltage, operating temperature, or operating current of the functional circuit block. In some embodiments, sensor circuit 152 and sensor circuit 154 sense different operating properties. For example, sensor circuit 152 may sense operating voltage while sensor circuit 154 senses operating temperature.

In the illustrated embodiment, sensor circuit 152 and sensor circuit 154 include ring oscillators. Ring oscillators may be implemented using inverters, NAND gates, other types of inverting circuitry, and various combinations thereof. In certain embodiments, as shown in FIG. 5, both sensor circuit 152 and sensor circuit 154 receive the same supply voltage (e.g., Vdd3). In some embodiments, Vdd3 can be different for different sensors on an integrated circuit. Sensor circuit 152 and sensor circuit 154 may be provided the same supply voltage as the sensor circuits are located in close proximity to one another. Though sensor circuit 152 and sensor circuit 154 receive the same supply voltage, the sensor circuits may have different circuit implementations (e.g., different ring oscillator implementations) to sense different operating properties. For example, sensor circuit 152 may include a ring oscillator that oscillates at a different frequency from a ring oscillator in sensor circuit 154 under identical operating conditions.

In certain embodiments, sensor circuit 152 is coupled to level shifter 156 and sensor circuit 154 is coupled to level shifter 158. Sensor circuits 152 and 154 may output signals that are responsive to values of the local operating properties being sensed by the sensor circuits. Level shifters 156 and 158 may shift the levels of the output signals received from sensor circuits 152 and 154 and provide shifted output signals to counters 160 and 162, respectively. The levels of the output signal from sensor circuits 152 and 154 may be shifted by level shifters 156 and 158 to change the output signal to correspond to supply voltages for additional components (e.g., counters 160 and 162) in sensor 150, as described below.

In certain embodiments, counters 160 and 162 are coupled to common sensor 164. Common sensor 164 may be, for example, a local aging sensor. In some embodiments, common sensor 164, during operation, generates and provides a local clock signal to each of counters 160 and 162 as well as to register 166. The local clock signal may be used by each of counters 160 and 162 as a timer that tracks a run time for allowing the counters to accumulate a count during a measurement. In some embodiments, common sensor 164 (which may be a free running oscillator in one embodiment) may be less sensitive to voltage and temperature variations than either one of sensor circuits 152 or 154. With regard to the particular circuit topology, common sensor 164 may be, for example, a ring oscillator implemented using inverters, NAND gates, other types of inverting circuitry, and various combinations thereof. Various parameters of the transistors used in implementing the circuitry may also be varied to achieve the desired sensitivities of common sensor 164. In some embodiments, common sensor 164 may be substantially independent of voltage and temperature variations, and more generally, may be less sensitive to these variations than either of the other sensor circuits 152 and 154.

In some embodiments, common sensor 164 is coupled to provide the local clock signal to counters 160 and 162 within sensor 150. Other embodiments are also contemplated in which a separate clock signal is provided to each counter. Although one embodiment of a clock circuit in sensor 150 is implemented using common sensor 164, it is noted that other types of circuits capable of generating a clock signal may be used in other embodiments. Generally speaking, any type of circuit suitable for generating a periodic signal suitable for use as a clock signal can be used to implement a local clock circuit in various embodiments of sensor 150. In some embodiments, common sensor 164 does not provide a clock signal to any circuit external to sensor 150. Furthermore, in some embodiments, none of the circuits in sensor 150 are coupled to receive a clock signal from any source external to the sensor. With respect to its physical location, common sensor 164 may be implemented on IC 100 (or more generally on an IC) in close proximity to the other circuitry of sensor 150.

In certain embodiments, as shown in FIG. 5, common sensor 164 may receive supply voltage Vdd1 (or Vdd2 depending on the processing unit). Thus, common sensor 164 may receive the supply voltage that corresponds to the supply voltage received in the functional circuitry in the processing unit (e.g., functional circuitry 132 in PU 130 or functional circuitry 142 in PU 140). In such embodiments, level shifters 156 and 158 are used to shift the output signals from sensor circuits 152 and 154, respectively, to levels that correspond to Vdd1 for sensors in PU 130 (or Vdd2 for sensors in PU 140). Shifting the levels of the output signals using level shifters 156 and 158 allows the logic coupled to common sensor 164 and Vdd1/Vdd2 (e.g., counters 160 and 162 and register 166) to track signals corresponding to the sensed local operating properties.

During the taking of a measurement of local operating properties, counters 160 and 162 may receive the shifted output signals from level shifters 156 and 158, respectively, to track one or more count values for sensor circuits 152 and 154, respectively. The count values in counters 160 and 162 may in turn indicate the frequencies produced by ring oscillators (or other sensing elements) in sensor circuits 152 and 154, respectively. The respective count values received by counters 160 and 162 may be the basis for solving for operating properties (e.g., voltage and temperature) at sensor 150.

In addition to having different circuit implementations (e.g., different ring oscillator implementations), as described above, sensor circuits 152 and 154 may be designed to have different relationships to voltage and temperature with respect to one another. For example, in some embodiments, one of sensor circuit 152 or sensor circuit 154 may be designed such that the frequency of its output signal is more sensitive to variations in voltage than the other one. Similarly, the other one of sensor circuit 152 or sensor circuit 154 may be designed such that the frequency of its output signal is more sensitive to variations in temperature than the other one. For the sensor circuit more sensitive to variations in voltage, the frequency of the output signal of the voltage sensitive sensor circuit (e.g., ring oscillator) may be more strongly dependent on voltage, with the frequency being a function of a large and linear voltage slope while its relationship to temperature may be non-linear. Similarly, for the sensor circuit that is more sensitive to temperature, the frequency of the output signal of the temperature sensitive sensor circuit (e.g., ring oscillator) may be more strongly dependent on temperature, with the frequency being a function of a large and linear temperature slope while its relationship to voltage may be non-linear. Nevertheless, the voltage and temperature values sensed by sensor 150 may be determined as discussed by example below by solving for these quantities based on the respective frequencies of the output signals (e.g., the ring oscillator output signals).

Figure 6:
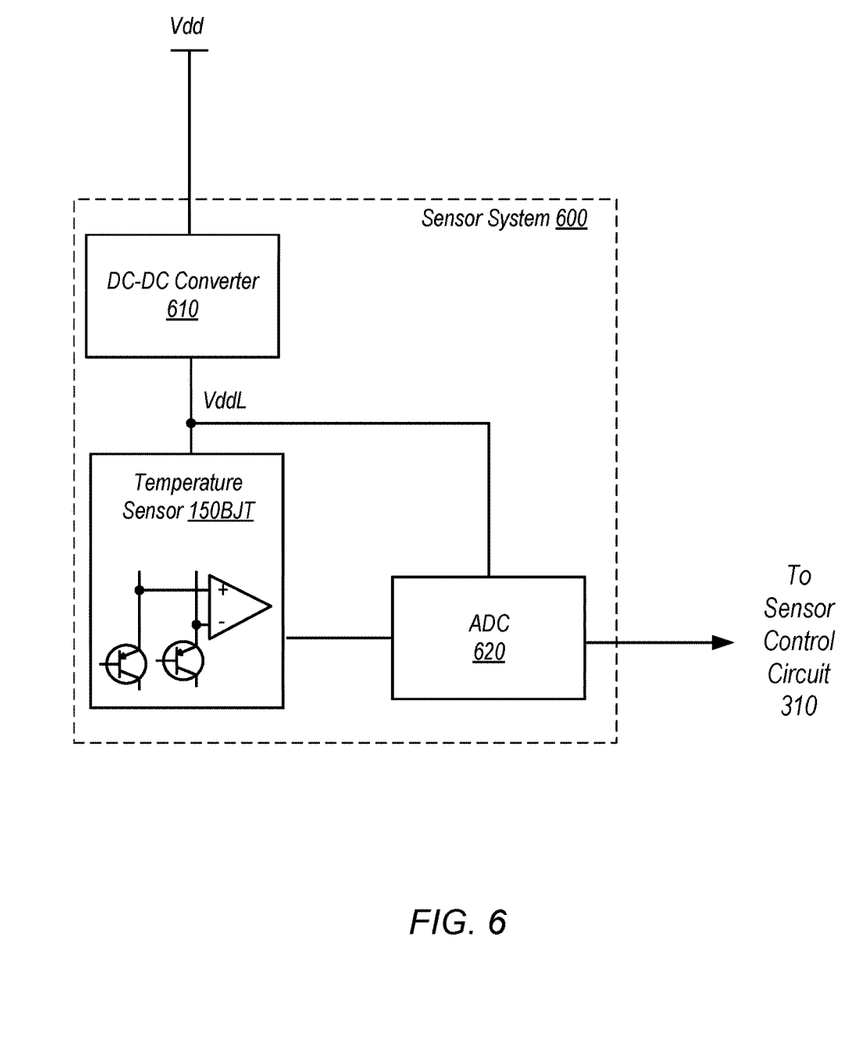
FIG. 6 depicts a block diagram illustrating an embodiment of a BJT-based sensor system.

As shown in FIG. 5, counters 160 and 162 are each coupled to register 166. Register 166 may be, for example, a shift register. Using register 166, sensor control circuit 310 (shown in FIGS. 3 and 4, described above) may input information into counters 160 and 162, and may also receive information therefrom. For example, information indicative of a run time for a counter to track a count value produced by the frequency of a correspondingly coupled sensor circuitry may be input into the counters, from sensor control circuit 310, via register 166. A start indication may also be input through register 166. From counters 160 and 162, register 166 may receive the count values produced during an actual measurement. Register 166 may output the count values (e.g., the sensor data) to sensor control circuit 310 for further processing, as described herein Example of BJT-Based Sensor FIG. 6 depicts a block diagram illustrating an embodiment of BJT-based sensor system 600. In the illustrated embodiment, sensor system 600 includes DC-DC converter 610, BJT-based temperature sensor 150BJT, and an ADC 620. ADC 620 may output sensor data indicative of a temperature that is sensed by temperature sensor 150BJT to sensor control circuit 310. DC-DC converter 610 is coupled to receive a supply voltage, Vdd, from an external source. In the example shown here, the supply voltage may be a regulated supply voltage, and may or may not be that upon which functional circuitry (such as functional circuitry 132, 142, or 210) operates. In various embodiments, DC-DC converter 610 is implemented as a boost converter, receiving the supply voltage Vdd and outputting, at a higher voltage level, a regulated local supply voltage, VddL. The regulated local supply voltage VddL is provide to both temperature sensor 150BJT and ADC 620 in the embodiment shown, and is suitable for use with analog circuitry implemented therein.

Temperature sensor 150BJT, in the embodiment shown, is a $\Delta V_{BE}$-type temperature sensor. More particularly, temperature sensor 150BJT may generate an indication of a temperature based on a difference between the base-emitter voltages of at least two different bipolar transistors having different current densities. This difference is provided to an amplifier as depicted in the drawing, with an analog signal generated based on this difference. As the difference corresponds to a temperature of a sensed temperature, characteristics of the analog signal may also correspond to the same.

In certain embodiments, ADC 620 is coupled to receive one or more analog signals from temperature sensor 150BJT, the analog signals corresponding to sensed temperatures. These analog signals may be converted into a digital format (e.g., sensor data) and provided to sensor control circuit 310 for further processing, as described herein. It is noted that while ADC 620 in the drawing shown is coupled to receive the regulated supply voltage, VddL from DC-DC converter 610, embodiments are possible and contemplated in which ADC 620 is powered separately from temperature sensor 150BJT, and may thus receive a global supply voltage or a separate regulated supply voltage (e.g., from a separate DC-DC converter).

Example Mathematical Solver

Figure 7:
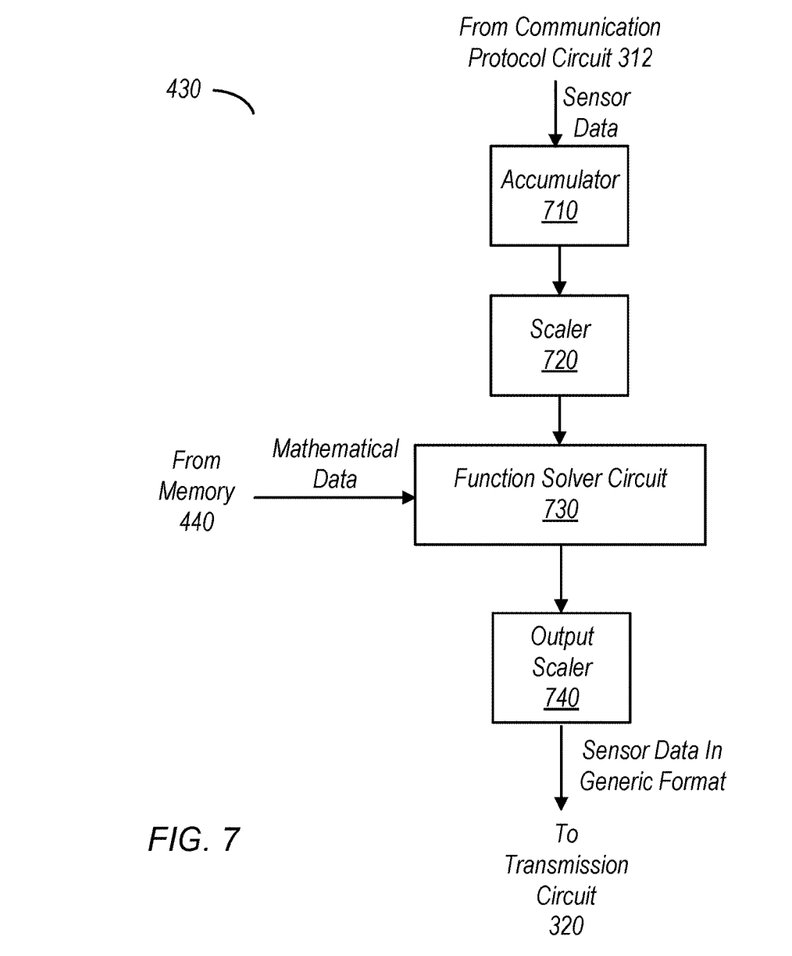
FIG. 7 depicts a block diagram illustrating an embodiment of mathematical solver.

FIG. 7 depicts a block diagram illustrating an embodiment of mathematical solver 430. In the illustrated embodiment, mathematical solver 430 includes accumulator 710, scaler 720, function solver circuit 730, and output scaler 740. Sensor data may be input from a temperature sensor (e.g., sensor 150 described herein) to accumulator 710. Accumulator 710 may be, for example, a programmable phase shifter or any other type of adder that enables multiple sensor readings to be accumulated. Accumulator 710 may add multiple sensor readings together to reduce noise in the signal process in mathematical solver 430.

After sensor readings are accumulated in accumulator 710, the sensor data may be scaled by scaler 720. In various embodiments, scaler 720 shifts the sensor data left or right to map the sensor data to function solver circuit 730. In certain embodiments, function solver circuit 730 is a polynomial circuit. The polynomial circuit may include, for example, a series of multiplication and add functions that represent the polynomial as a mathematical function. Function solver circuit 730 is programmable based on mathematical data retrieved from memory 440. For instance, function solver circuit 730 may implement coefficients retrieved from memory 440 that can be applied to the multiplication and add functions implemented in the polynomial circuit.

Function solver circuit 730 may output the sensor data, which is now in generic format, to output scaler 740. In various embodiments, output scaler 740 scales the output in order to map the output for further processing in transmission circuit 320 and beyond (such as a PMU or microcontroller). In some embodiments, output scaler 740 scales the output in response to the input being scaled by scaler 720. For example, output scaler 740 shifts the sensor data left or right based on the shifting performed by scaler 720. Scaling the input and output may, for instance, prevent bits from overflowing a component (such as the PMU) in integrated circuit 100.

Example Method

Figure 8:
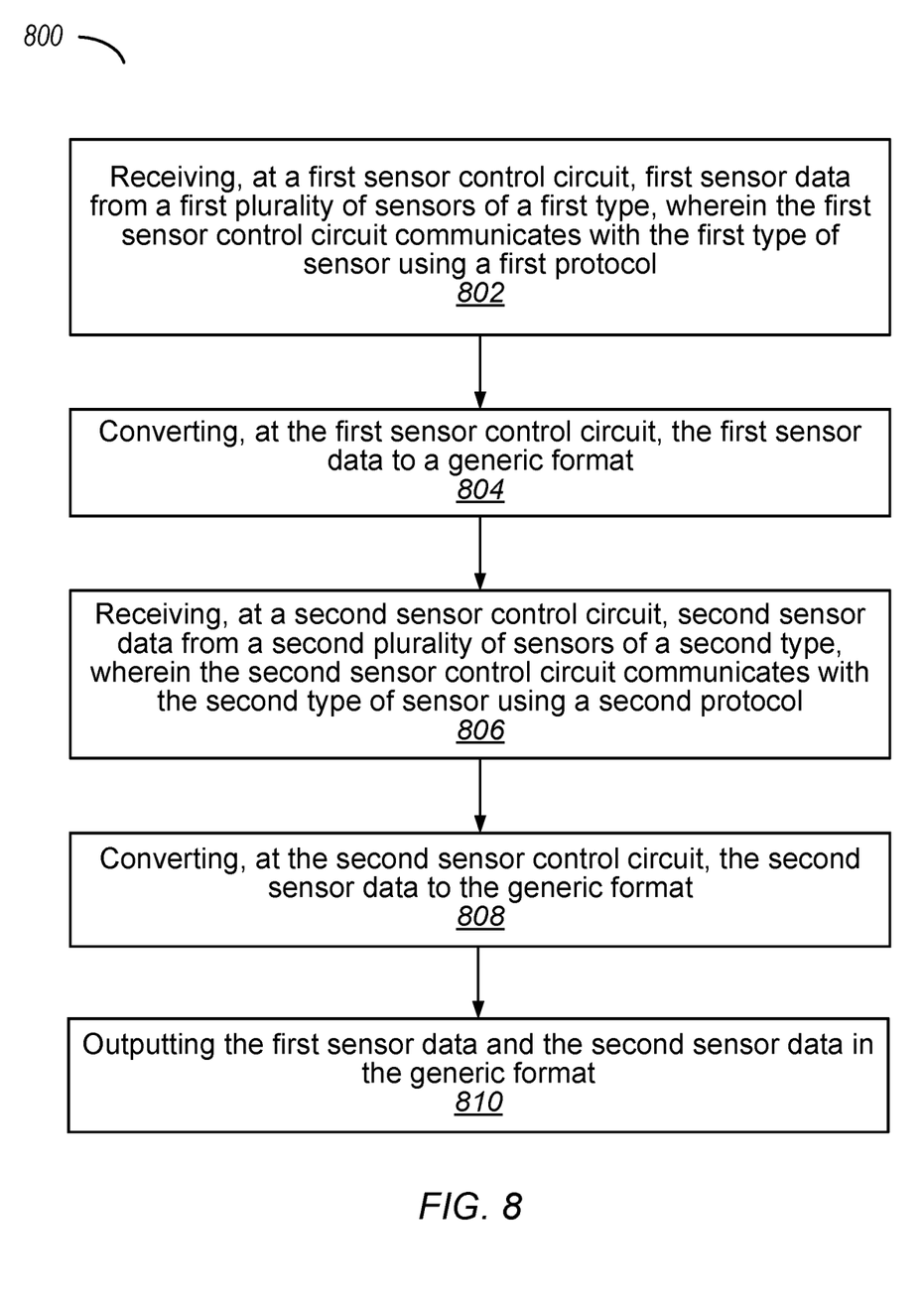
FIG. 8 is a flow diagram illustrating a method for communicating with multiple sensor types, according to some embodiments.

FIG. 8 is a flow diagram illustrating a method for communicating with multiple sensor types, according to some embodiments. Method 800 may be implemented using any of the embodiments of a MCC as disclosed herein, in conjunction with any circuitry or other mechanism in an integrated circuit.

At 802, in the illustrated embodiment, a first sensor control circuit receives first sensor data from a first plurality of sensors of a first type, wherein the first sensor control circuit communicates with the first type of sensor using a first protocol.

At 804, in the illustrated embodiment, the first sensor control circuit converts the first sensor data to a generic format.

At 806, in the illustrated embodiment, a second sensor control circuit receives second sensor data from a second plurality of sensors of a second type, wherein the second sensor control circuit communicates with the second type of sensor using a second protocol.

At 808, in the illustrated embodiment, the second sensor control circuit converts the second sensor data to a generic format.

At 810, in the illustrated embodiment, the first sensor data and the second sensor data are output in the generic format.

Example Computer System

Figure 9:
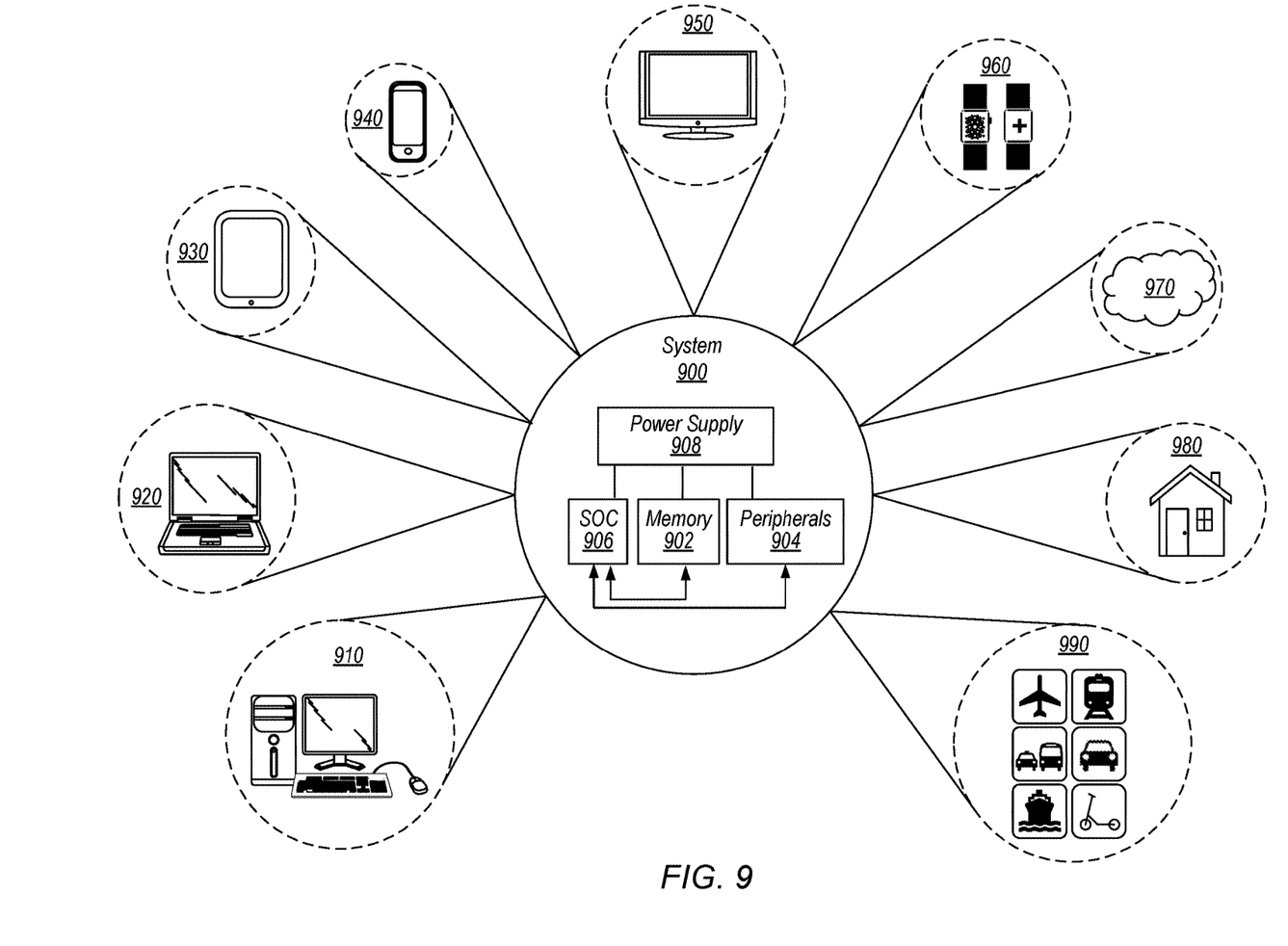
FIG. 9 is a block diagram of one embodiment of an example system.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a U.S. patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A sensor interface circuit, comprising:
   a first sensor control circuit coupled to a first plurality of sensors of a first type in an integrated circuit device, wherein the first sensor control circuit includes:
      a first communication protocol circuit configured to communicate with the first type of sensor using a first protocol; and
      a first conversion circuit configured to convert sensor data from the first plurality of sensors to a generic format;
   a second sensor control circuit coupled to a second plurality of sensors of a second type in the integrated circuit device, wherein the first plurality of sensors and the second plurality of sensors include serially connected chains of sensors in the integrated circuit device, and wherein the second sensor control circuit includes:
      a second communication protocol circuit configured communicate with the second type of sensor using a second protocol; and
      a second conversion circuit configured to convert sensor data from the second plurality of sensors to the generic format; and
   a transmission circuit coupled to the first sensor control circuit and the second sensor control circuit, wherein the transmission circuit is configured to output the sensor data in the generic format.

2. The circuit of claim 1, wherein the first type of sensors is different from the second type of sensors, and wherein the first protocol is different from the second protocol.

3. The circuit of claim 1, wherein the first type of sensors is the same as the second type of sensors, and wherein the first protocol is the same as the second protocol.

4. The circuit of claim 1, wherein the first communication protocol circuit maps the sensor data from the first plurality of sensors into a first format for the first conversion circuit, and wherein the second communication protocol circuit maps the sensor data from the second plurality of sensors into a second format for the second conversion circuit.

5. The circuit of claim 1, wherein the first communication protocol circuit changes a length of the sensor data from the first plurality of sensors to map the sensor data to the first conversion circuit.

6. The circuit of claim 1, wherein the first conversion circuit includes a mathematical function solver that converts the sensor data from the first plurality of sensors into the generic format, and wherein the mathematical function solver is configured to retrieve coefficients for a polynomial function from a memory in the sensor interface circuit.

7. The circuit of claim 1, wherein the generic format includes a generic temperature value format.

8. The circuit of claim 1, wherein the first plurality of sensors and the second plurality of sensors are configured to assess one or more local operating properties of the integrated circuit device.

9. The circuit of claim 1, wherein the first communication protocol circuit is configured to adjust a length of a data packet including the sensor data received from the first plurality of sensors.

10. A method comprising:
receiving, at a first sensor control circuit in an integrated circuit device, first sensor data from a first plurality of sensors of a first type, wherein the first sensor control circuit communicates with the first type of sensor using a first protocol;
converting, at the first sensor control circuit, the first sensor data to a generic format;
receiving, at a second sensor control circuit in the integrated circuit device, second sensor data from a second plurality of sensors of a second type, wherein the first plurality of sensors and the second plurality of sensors include serially connected chains of sensors, and wherein the second sensor control circuit communicates with the second type of sensor using a second protocol;
converting, at the second sensor control circuit, the second sensor data to the generic format; and
outputting the first sensor data and the second sensor data in the generic format.

11. The method of claim 10, further comprising transmitting the first sensor data and the second sensor data in the generic format to a power management unit or microcontroller.

12. The method of claim 10, wherein the first protocol is implemented by a first communication protocol circuit in the first sensor control circuit, and wherein the second protocol is implemented by a second communication protocol circuit in the second sensor control circuit.

13. The method of claim 10, wherein the conversion of the first sensor data is implemented by a first conversion circuit in the first sensor control circuit, and wherein the conversion of the second sensor data is implemented by a second conversion circuit in the second sensor control circuit.

14. The method of claim 10, wherein the conversion of the first sensor data and the conversion of the second sensor data are implemented by mathematical function solver circuits in the first sensor control circuit and the second sensor control circuit.

15. The method of claim 10, further comprising assessing one or more local operating properties of the integrated circuit device based on output of the first sensor data and the second sensor data in the generic format.

16. An integrated circuit device, comprising:
a plurality of sensors distributed in the integrated circuit device, the plurality of sensors including a first set of serially connected sensors of a first type and a second set of serially connected sensors of a second type;
a plurality of sensor control circuits, wherein two or more of the sensor control circuits include:
a communication protocol circuit configured to communicate with a given set of serially connected sensors, and
a conversion circuit configured to convert sensor data from a specified set of serially connected sensors to a generic format;
wherein a first of the two or more sensor control circuits is programmed to communicate with the first set of sensors using a first specified protocol and convert sensor data from the first set of sensors to the generic format;
wherein a second of the two or more sensor control circuits is programmed to communicate with the second set of sensors using a second specified protocol and convert sensor data from the second set of sensors to the generic format; and
a transmission circuit coupled to the plurality of sensor control circuits, wherein the transmission circuit is configured to output the sensor data in the generic format.

17. The device of claim 16, wherein the communication protocol circuit in the first of the two or more sensor control circuits is programmed to communicate using the first specified protocol, and wherein the conversion circuit in the first of the two or more sensor control circuits is programmed to convert sensor data from the first type of sensors into the generic format.

18. The device of claim 16, wherein the communication protocol circuit in the second of the two or more sensor control circuits is programmed to communicate using the second specified protocol, and wherein the conversion circuit in the second of the two or more sensor control circuits is programmed to convert sensor data from the second type of sensors into the generic format.

19. The device of claim 16, wherein the conversion circuit in the sensor control circuits include a function solver circuit, the conversion circuit in the first of the two or more sensor control circuits being programmed with a first set of coefficients corresponding to the first type of sensors and the conversion circuit in the second of the two or more sensor control circuits being programmed with a second set of coefficients corresponding to the second type of sensors.

20. The device of claim 19, wherein the function solver circuit is configured to convert the sensor data into the generic format according to a given set of coefficients programmed into the function solver circuit.

* * * * *